US011392649B2

(12) United States Patent
Garg et al.

(10) Patent No.: US 11,392,649 B2
(45) Date of Patent: Jul. 19, 2022

(54) BINDING QUERY SCOPE TO DIRECTORY ATTRIBUTES

(71) Applicant: Microsoft Technology Licensing, LLC, Redmond, WA (US)

(72) Inventors: Nakul Garg, Sammamish, WA (US); Gagandeep S. Kohli, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 284 days.

(21) Appl. No.: 16/038,548

(22) Filed: Jul. 18, 2018

(65) Prior Publication Data
US 2020/0026804 A1    Jan. 23, 2020

(51) Int. Cl.
*G06F 16/903*        (2019.01)
*G06F 16/9038*       (2019.01)
(Continued)

(52) U.S. Cl.
CPC ...... *G06F 16/90335* (2019.01); *G06F 16/168* (2019.01); *G06F 16/9017* (2019.01); *G06F 16/9038* (2019.01)

(58) Field of Classification Search
CPC ............. G06F 16/90335; G06F 16/168; G06F 16/9017; G06F 16/9038; G06F 3/04842; G06F 16/2428; G06F 16/332; G06Q 10/10
See application file for complete search history.

(56) References Cited

U.S. PATENT DOCUMENTS 6,202,066 B1    3/2001  Barkley et al.
6,356,899 B1 *  3/2002  Chakrabarti .......... G06F 16/954
                                              707/737
(Continued)

FOREIGN PATENT DOCUMENTS

WO    2017172635 A1    10/2017

OTHER PUBLICATIONS

"HCM Data Roles and Security Profiles", Retrieved from: https://docs.oracle.com/en/cloud/saas/applications-common/r13-update17d/ochus/hcm-data-roles-and-security-profiles.html#OCHUS163383, May 22, 2018, 21 Pages.
(Continued)

*Primary Examiner* — Hares Jami
*Assistant Examiner* — Zuheir A Mheir
(74) *Attorney, Agent, or Firm* — Newport IP, LLC; Jacob P. Rohwer

(57) ABSTRACT

A query scoping service enables administrators to scope a directory attribute bound query to an organizational boundary within an organizational structure. The directory attribute bound query may be scoped to a subset of users that have specific value(s) for specific user attributes. The directory attribute bound query includes a search string. Data that is analyzed with respect to the search string is limited to data that is stored in association with users that have specific value(s) for specific user attributes. In this way, data files that are stored in association with users that do not have the specific values for the specific directory attributes will be omitted from query results. The directory attribute bound query may be tied to data retention rules. Since the scope of the directory attribute bound query is defined based on the organizational structure, the query scope remains accurate notwithstanding changes occurring in the organizational structure.

20 Claims, 8 Drawing Sheets

(51) Int. Cl.
*G06F 16/901* (2019.01)
*G06F 16/16* (2019.01)

(56) References Cited

U.S. PATENT DOCUMENTS

| | | | |
|---|---|---|---|
| 6,405,212 B1* | 6/2002 | Samu | G06F 16/21 |
| 6,732,100 B1* | 5/2004 | Brodersen | G06F 21/6227 |
| 7,269,585 B1* | 9/2007 | Burke | G06F 16/954 |
| 7,904,504 B2 | 3/2011 | Erickson et al. | |
| 7,979,433 B2* | 7/2011 | Vora | G06F 16/248 |
| | | | 707/736 |
| 8,516,050 B1* | 8/2013 | Chapweske | H04L 12/1881 |
| | | | 709/204 |
| 8,572,511 B1* | 10/2013 | Barnett | G06F 16/2428 |
| | | | 715/848 |
| 9,253,216 B2 | 2/2016 | Lim | |
| 9,922,308 B2* | 3/2018 | Mudler | G06Q 10/10 |
| 2002/0143943 A1* | 10/2002 | Lee | G06Q 40/12 |
| | | | 709/225 |
| 2002/0147801 A1 | 10/2002 | Gullotta et al. | |
| 2003/0217052 A1* | 11/2003 | Rubenczyk | G06F 16/3323 |
| 2004/0205064 A1* | 10/2004 | Zhou | G06F 16/2462 |
| 2007/0208697 A1* | 9/2007 | Subramaniam | G06F 16/33 |
| 2008/0147657 A1* | 6/2008 | Vora | G06Q 10/10 |
| 2008/0222108 A1* | 9/2008 | Prahlad | G06F 16/313 |
| 2013/0104046 A1* | 4/2013 | Casco-Arias Sanchez | |
| | | | H04L 63/20 |
| | | | 715/736 |
| 2013/0212479 A1* | 8/2013 | Willis | G06Q 10/10 |
| | | | 715/736 |
| 2013/0232539 A1* | 9/2013 | Polunin | G06Q 10/047 |
| | | | 726/1 |
| 2013/0246477 A1* | 9/2013 | Faitelson | G06F 21/604 |
| | | | 707/786 |
| 2014/0075492 A1* | 3/2014 | Kapadia | H04L 63/102 |
| | | | 726/1 |
| 2014/0181086 A1* | 6/2014 | Wable | G06F 16/9535 |
| | | | 707/722 |
| 2015/0371430 A1* | 12/2015 | Brewington | G06T 19/20 |
| | | | 345/428 |
| 2016/0217424 A1* | 7/2016 | Challenger | G06Q 10/067 |
| 2016/0232217 A1* | 8/2016 | Fulton | G06F 16/248 |
| 2016/0267700 A1* | 9/2016 | Huang | G06F 40/166 |
| 2016/0364407 A1* | 12/2016 | Hong | G06F 16/183 |
| 2017/0031998 A1* | 2/2017 | Olivier | G06F 16/9535 |
| 2017/0034313 A1* | 2/2017 | Olivier | G06Q 50/01 |
| 2017/0063753 A1* | 3/2017 | Probasco | H04L 51/10 |
| 2017/0109014 A1* | 4/2017 | Gindi | G06F 3/04842 |
| 2017/0109445 A1* | 4/2017 | Daya | G06F 16/9535 |
| 2017/0364584 A1* | 12/2017 | Ginter | G06F 16/148 |
| 2019/0205556 A1* | 7/2019 | Kleinpeter | G06F 16/13 |
| 2019/0303477 A1* | 10/2019 | Kapinos | G06F 16/9535 |

OTHER PUBLICATIONS

Barkley, et al., "Supporting Relationships in Access Control Using Role Based Access Control", In Proceedings of the Fourth ACM Workshop on Role-based Access Control, Jul. 29, 1999, pp. 55-65.

Hu, et al., "Attribute-Based Access Control", In Journal of Computer, vol. 48, Issue 2, Feb. 2015, pp. 85-88.

Christian, Daniel, "Update a secondary SharePoint list using Flow", Retrieved from: https://www.youtube.com/watch?v=UMkIPub88IU, May 26, 2017, 3 Pages.

McAllister, Jamie, "SharePoint auto-tagging with AI and Flow-No Code", Retrieved from: https://www.youtube.com/watch?v=QV3-lerjpus, Feb. 25, 2018, 7 Pages.

"International Search Report and Written Opinion Issued in PCT Application No. PCT/US2019/037842", dated Aug. 21, 2019, 18 Pages.

* cited by examiner

BINDING QUERY SCOPE TO DIRECTORY ATTRIBUTES

BACKGROUND

Modern organizations often have complex organizational structures that include numerous users spread across a variety of different departments. The complexity of such organizational structures leads to difficulties when administrators seek to perform certain actions with respect to particular groups of users. For instance, an administrator may attempt to perform a particular type of query against data files that are generated and/or edited by a particular group of users. Using conventional query services, administrators are required to manually add and/or remove users to queries on an individual basis. Thus, if an administrator wishes to set a scope of a particular query to a particular department within the organizational structure, the administrator will need to identify the users that belong to this department and then manually add them to the particular query. This is an unfortunately cumbersome and error prone process.

Furthermore, even assuming the administrator accurately builds the query by individually adding the correct users, the accuracy of the query may quickly be lost due to the dynamic nature of a typical organizational structure. For instance, users may join and/or leave the particular department shortly after the query is accurately built. This example demonstrates the unique challenges of maintaining the accuracy of queries that are intended to persist over a period of time. Specifically, maintaining the accuracy of such queries requires the administrator to not only stay apprised of changes to the organizational structure but also to respond to such changes by manually updating individual queries.

It is with respect to these considerations and others that the disclosure made herein is presented.

SUMMARY

The systems and methods disclosed herein address the problems described above. Specifically, the query scoping service described herein enables administrators to generate directory attribute bound queries that are dynamically scoped to user subsets within an organizational structure. For example, a particular query may be dynamically scoped to a group of users that have specific value(s) for specific user attributes within the organizational structure. A query having a scope that is bound to specific values for specific directory attributes is referred to herein as a "directory attribute bound query." In addition to defining the scope, the administrator may further define a search string for the directory attribute bound query. Ultimately, application of the directory attribute bound query may be limited to data files that are stored in association with a user subset that has the specific values for the specific directory attributes. For example, data files that are stored in association with users that do not have the specific values for the specific directory attributes may be omitted from query results even if those data files otherwise satisfy the search query. Furthermore, since the scope of the directory attribute bound query is defined based on the organizational structure, the query scope remains accurate even as changes occur in the organizational structure. In this way, administrators can set up a directory attribute bound query with respect to a particular group of users within an organizational structure. Then, even as users are subsequently added to and/or removed from the particular group of users, the directory attribute bound query automatically accounts for such changes so that the query scope remains true to the administrator's original design intent. In some implementations, these directory attribute bound queries may be linked to compliance policy labels or rules so that individual compliance policy rules can be applied and/or un-applied from individual users accounts automatically as changes occur within an organizational structure.

In an exemplary embodiment, a query scoping service exposes a query management portal to enable an administrator to generate directory attribute bound queries. The query scoping service may obtain directory data for various users within an organizational structure. The directory data may define specific values for various user attributes such as, for example, a "Department" user attribute, a "Location" user attribute, etc. Based on the directory data, the query scoping service may cause the query management portal to display aspects of the organizational structure. For example, the query management portal may display a graphical representation of the organizational structure in a hierarchical format that visually communicates reporting structures and/or subsets of users that belong to particular departments.

The query scoping service may receive, via the query management portal, a directory attribute bound query that defines a search string and boundary parameters. The search string may include various combinations of terms and/or file properties that define which files are relevant, i.e., which files satisfy the search string. As a more specific but non-limiting example, a search string may be designed to identify individual data files as being "relevant" data files based on one or more keywords contained within the data file (e.g., files containing at least one of the terms "Liability", or "Lawsuit", etc.). The boundary parameters may prescribe specific values for one or more specific user attributes that correspond to the directory data. As a more specific but nonlimiting example, the boundary parameters may prescribe a value of "Legal" for a "Department" directory attribute to dynamically limit a query scope to include only users that are indicated within the directory data as being members of the Legal Department.

The query scoping service may analyze the boundary parameters with respect to the directory data to determine an organizational boundary that includes a subset of users that have the specific value for the specific user attributes. Via the query management portal, the organizational boundary may be graphically represented in association with aspects of the organizational structure. As a specific but nonlimiting example, the query management portal may cause a graphical representation of the organizational structure in the hierarchical format with a dashed outline that represents the organizational boundary being concurrently displayed over the graphical representation of the organizational structure. In some implementations, the query management portal may include one or more user interface (UI) elements to enable an administrator to define and/or modify boundary parameters for the directory attribute bound query by manipulating one or both of the graphical representation of the organizational structure or a dashed outline that represents the organizational boundary. As a specific but nonlimiting example, the query management portal may include one or more UI elements that are graphical representations of individual users and that an administrator may graphically manipulate (e.g., via a click and drag function) into the dashed outline of the organizational boundary. In response to this user input, the query scoping service may automatically update the boundary parameters to include particular user(s)

that the administrator has manipulated into the dashed outline of the organizational boundary.

Once the boundary parameters have been defined so that the organization boundary and corresponding subset of users are ascertainable, the query scoping service may parse various data sets to identify a subset of data files that are stored in association with the subset of users. As a specific but non-limiting example, an organization may implement and/or subscribe to one or more productivity platforms to provide all users within a particular organizational structure with their own individual email account and file hosting account. The productivity platform(s) may store data sets in association with the email accounts and the file hosting accounts. The query scoping service may parse through these data sets to identify a subset of files that are stored in the email accounts and file hosting accounts of the subset of users only—as opposed to all of the users within the organizational structure.

In some embodiments, the directory attribute bound query further includes workload parameters that indicate which individual productivity platforms of multiple productivity platforms the query scope is to include. For example, users within an organization may be provisioned with access to multiple productivity platforms that come as components of a productivity suite. The workload parameters may indicate that the directory attribute bound query is applicable to only a subset of the multiple productivity platforms. In this way, in addition to being limited to only data files that are stored in association with (e.g., "owned by") the subset of users that have the specific values for the specific attributes, the subset of data files may also be limited to only data files that are stored in association with specifically selected productivity platforms.

Once the subset of data files is identified, the query scoping service may then analyze the individual ones of the subset of data files to identify query results, i.e. individual data files that satisfy the search string. It can be appreciated that if a particular data file is stored in association with a user that is not included within the organizational boundary, this particular data file will not be returned within the query results even if it satisfies the search string. Moreover, this particular data file will not even be analyzed with respect to the search string and, therefore, among many other technical benefits the query scoping service described herein may serve to conserve computing resources by limiting the number of data files that are analyzed in association with a particular query.

The presently disclosed techniques are believed to be applicable to a variety of systems and approaches involving binding a query scope for a particular query to specific values for directory attributes and/or specific productivity platforms. Aspects of this disclosure are predominantly described in the context of an administrator generating directory attribute bound queries to search for relevant content that is stored in association with users that are within some organizational boundary. For example, an administrator may search for email documents or other data files that contain certain terms and may limit the scope of the search to a specific department within an organization. Aspects of this disclosure are also predominantly described in the context of relevant content being returned to the administrator through a query management portal as search results (e.g., query results). While the presently disclosed techniques are not necessarily limited to these specific implementation details, an appreciation of various aspects of the disclosed techniques is best gained through a discussion of examples in the aforementioned contexts. However, various other actions may be performed with respect to query results that are identified based on directory attribute bound queries. For example, an individual directory attribute bound query may correspond to a data retention tag. In such an example, the query scoping service may be caused to automatically apply the data retention tag to the individual data files that make up the query results. These and other variations shall be considered variations that do not depart from the present disclosure.

It should be appreciated that, although described in relation to a system, the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes a query scoping service that enables administrators to set a scope for directory attribute bound queries to an organizational boundary that includes a subset of users from an organizational structure. More specifically, the directory attribute bound queries may be exclusively scoped to a subset of users that have specific value(s) for specific user attributes. Administrators may further define a search string for the directory attribute bound query. The set of data files that are analyzed with respect to the search string may be limited to data files that are stored in association with the subset of users that have specific value(s) for specific user attributes. In this way, data files that are stored in association with users that do not have the specific values for the specific directory attributes will be omitted from query results even if those data files otherwise satisfy the search query. Furthermore, since the scope of the directory attribute bound query is defined based on the organizational structure, the query scope remains accurate even as changes occur in the organizational structure.

Figure 1:
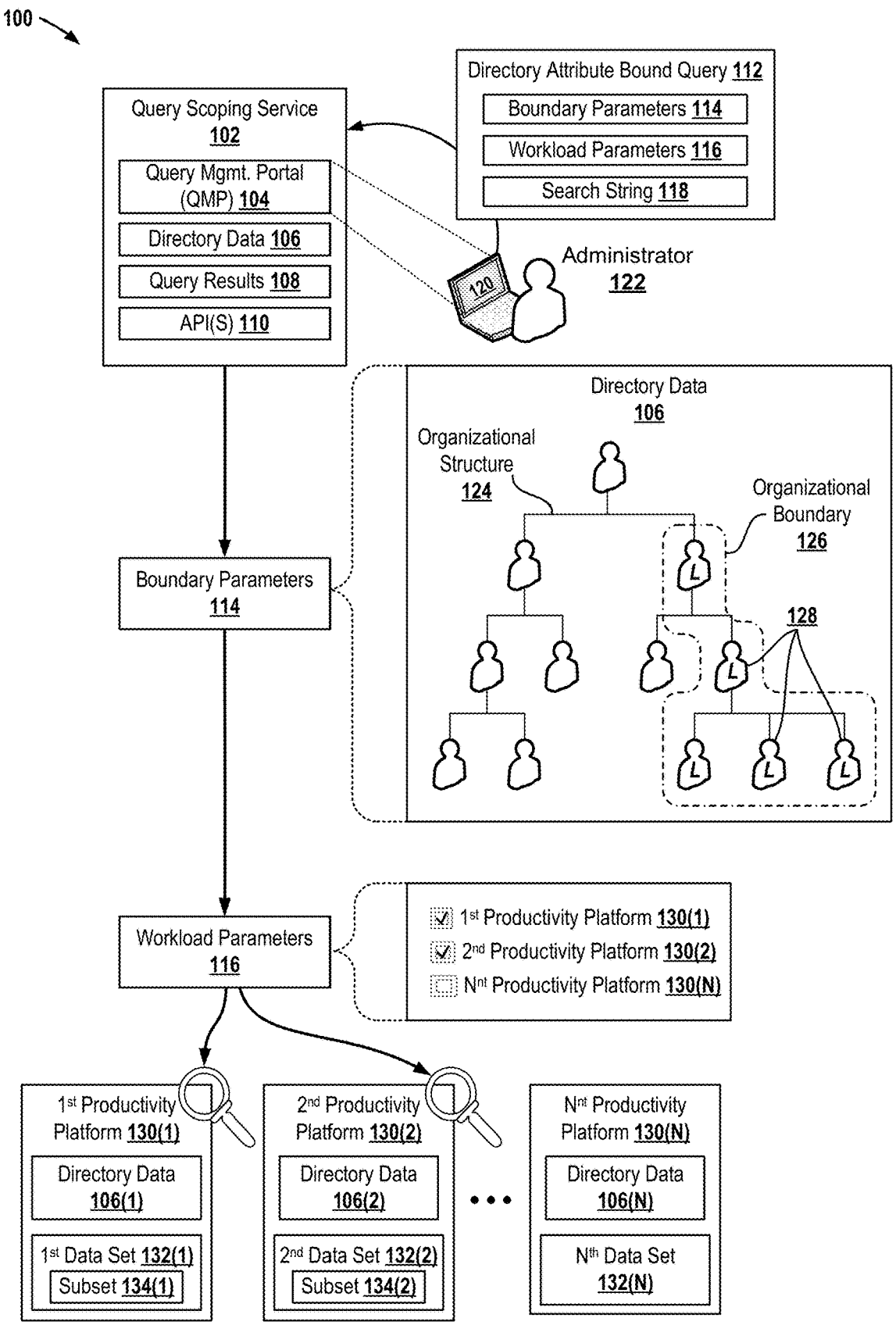
FIG. 1 illustrates example data flow scenario of a system that deploys a query scoping service to implement a directory attribute bound query selectively across various productivity platforms.

To illustrate aspects of the techniques disclosed herein: FIG. 1 illustrates a data flow scenario of a system that implements a directory attribute bound query selectively across multiple productivity platforms; and FIGS. 2 through 4B illustrate various graphical user interfaces (GUI) and corresponding user inputs for defining directory attribute bound queries. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1-4B, may be combined in any order and/or in parallel in accordance with the present disclosure. Other processes and/or operations and/or functionalities described throughout this disclosure shall be interpreted accordingly.

Turning now to FIG. 1, an example data flow scenario is illustrated with respect to a system 100 that deploys a query scoping service 102 to implement a directory attribute bound query 112 selectively across one or more productivity platforms 130. The query scoping service 102 may be configured to expose a query management portal 104 to enable an administrator 122 to define various aspects of the directory attribute bound query 112. In the illustrated example, the query management portal 104 enables the administrator to define one or more of boundary parameters 114, workload parameters 116, and a search string 118.

The query scoping service 102 may store or otherwise have access to directory data 106 associated with an organization (e.g., a company or enterprise). The directory data 106 may define user attributes and associated values for a plurality of users 128 within an organizational structure 124. For example, the directory data 106 may include data entry fields for a plurality of user attributes such as, for example, a "Department" user attribute that indicates which department a user belongs to, a "Location" user attribute that indicates one or more geographic locations at which a user is employed and/or stationed, a "Grade/Level" attribute that indicates a rank of the user within the organizational structure 150, etc. An exemplary form of the directory data 106 includes, but is not limited to, MICROSOFT Azure Active Directory data that defines a registry of users for the organization. The registry that is defined in the directory data 106 may include individual data objects (e.g., Active Directory objects) for the individual users. These individual data objects may be used to store values for the individual user attributes.

The boundary parameters 114 that are included within the directory attribute bound query 112 may prescribe specific values for one or more of the user attributes that are defined by the directory data 106. As a specific but nonlimiting example, the boundary parameters 114 may prescribe a value of "Legal" for the "Department" directory attribute that is defined by the directory data 106. In this way, the administrator 122 can dynamically limit the query scope for the directory attribute bound query 112 to include only users that are indicated within the directory data 106 as being members of the Legal Department.

The workload parameters 116 that are included within the directory attribute bound query 112 may indicate which individual productivity platforms 130, of multiple productivity platforms 130, the directory attribute bound query 112 is applicable to. For example, users within the organization may be provisioned with access to multiple productivity platforms 130 that come as components of a productivity suite. In the illustrated example, users within the organization are provisioned with access to a first productivity platform 130(1) through an $N^{th}$ productivity platform 130(N). As further illustrated, the workload parameters 116 indicate individual platform selections for the first productivity platform 130(1) and a second productivity platform 130(2)—but not the $N^{th}$ productivity platform 130(N).

As used herein, the term "productivity platform" refers to local and/or web-based software that is dedicated to producing, modifying, and/or accessing information such as, for example, email, live chat sessions, word processing documents, presentations, workbooks (a.k.a. "worksheets"), and/or Internet/Intranet share sites. Exemplary productivity platforms 130 include, but are not limited to, communication platforms (e.g. email services, instant messaging services, on-line video chat services, etc.) and file hosting platforms (e.g. personal cloud-based storage, online file sharing services). Furthermore, in some implementations, the individual productivity platforms 130 may be components of a productivity suite (e.g. GOOGLE G-SUITE, ZOHO Office Suite, or MICROSOFT OFFICE 365) such that a single set of user credentials may be issued to provision a user with access to a plurality of different productivity platforms 130. Exemplary productivity platforms 130 may include, but are not limited to, communication platforms (MICROSOFT OUTLOOK and/or GMAIL) and file hosting platforms (e.g., MICROSOFT WORD ONLINE, MICROSOFT EXCEL ONLINE, MICROSOFT POWERPOINT ONLINE, MICROSOFT ONEDRIVE, GOOGLE DOCS, GOOGLE SHEETS, GOOGLE SLIDES, and/or GOOGLE DRIVE).

The search string 118 that is included within the directory attribute bound query 112 may include various combinations of terms and/or file properties that define which files are relevant. As used herein, a data file that contains terms and/or file properties which satisfy the search string 118 may be referred to as being a "relevant data file." In some embodiments, the search string 118 may be designed so that individual data files that contain one or more specific keywords are deemed as being "relevant" data files. As a specific but non-limiting example, the search string 118 may indicate that files containing at least one of the terms "Liability" or "Lawsuit" are "relevant" data files (i.e., such files positively satisfy the search string 118). In some embodiments, the search string 118 may be designed so that individual data files that have one or more specific file properties are deemed as being "relevant" data files. As a specific but non-limiting example, the search string 118 may indicate that files that are at least a certain age and/or file that originate from a particular template are "relevant" data files.

With respect to the application of the directory attribute bound query 112, the query scoping service 102 may analyze the boundary parameters 114 with respect to the directory data 106 to determine an organizational boundary 126. As illustrated, the organizational boundary 126 may include a subset of users for which the values for certain user attributes as currently defined in the directory data 106 match the specific values prescribed for these certain user attributes by the boundary parameters 114. For example, under circumstances in which the boundary parameters 114 prescribe a value of "Legal" for a "Department" directory attribute, the organizational boundary 126 may include all users that are indicated within the directory data 106 as currently being members of the Legal Department while excluding all other users. In the illustrated example, individual users that are members of the Legal Department are marked with an "L" and the organizational boundary 126 is shown to exclusively encompass this subset of users.

In some embodiments, the query scoping service 102 is configured to analyze the boundary parameters 114 with respect to the directory data 106 each time the directory attribute bound query 112 is executed. In this way, even as the directory data 106 evolves over time as individual users' attribute values change, the organizational boundary 126 that is determined when the directory attribute bound query 112 is executed remains true to the administrator's 122 design intent. For example, continuing with the example where the boundary parameters 114 prescribe a value of "Legal" for a "Department" directory attribute, even if users are added to and/or removed from the Legal Department the organizational boundary 126 with be re-determined to account for such changes.

In some embodiments, the query scoping service 102 is configured to analyze the boundary parameters 114 with respect to the directory data 106 in response to a trigger event occurring in association with the organizational structure 124. An exemplary trigger event may include, but is not limited to, an update occurring with respect to the organizational structure 124 (e.g., a new version of the organizational structure being released, a user being added to and/or deleted from the orbitational structure, etc.). In this way, the query scoping service 102 may be configured to determine an updated organizational boundary that includes an updated user subset in response to the trigger event(s).

The query scoping service 102 may also analyze the workload parameters 116 to determine one or more data sets 132 to parse to identify a subset of data files 134 that are stored in association with the subset of users that are within the organizational boundary 126. As illustrated, for example, a first data set 132(1) is stored in association with the first productivity platform 130(1), a second data set 132(2) is stored in association with the second productivity platform 130(2), and an $N^{th}$ data set 132(N) is stored in association with the $N^{th}$ productivity platform 130(N). In the illustrated example, since the workload parameters 116 indicate platform selections of only the first productivity platform 130(1) and the second productivity platform 130(2), the query scoping service 102 will parse only the first data set 132(1) and the second data set 132(2) when identifying the subset of data files 134. Thus, in the specific but nonlimiting example of FIG. 1, the subset of data files 134 is made of a first subset 134(1) that corresponds to the first productivity platform 130(1) and a second subset 134(2) that corresponds to the second productivity platform 130(2). However, due to the $N^{th}$ productivity platform 130(N) not being selected in the workload parameters 116, no such subset exists with respect to the $N^{th}$ productivity platform 130(N) and the $N^{th}$ data set 132(N) is not even parsed based on the organizational boundary 126. In this way, in addition to being limited to only data files that are stored in association with (e.g., "owned by") the subset of users that have the specific values for the specific attributes, the subset 134 of data files may also be limited to only data files that are stored in association with specifically selected productivity platforms.

Once the subset of data files 134 is identified, the query scoping service 102 then analyzes the individual ones of the subset of data files 134 to identify query results 108. The query results 108 include those individual data files that are within the subset of data files 134 and that satisfy the search string 118. It can be appreciated that if a particular data file is stored in association with a user that is not included within the organizational boundary 126, this particular data file will not be returned within the query results 108—even if it satisfies the search string 118. Furthermore, in various implementations, the query scoping service 102 will not even analyze this particular data file with respect to the search string 118. Thus, implementations of the techniques disclosed herein serve to conserve computing resources by limiting the number of data files that are analyzed in association with a particular query. This provides benefits over conventional query services which indiscriminately analyze entire data sets with respect to search strings rather than first parsing the data sets into smaller subsets of data files that are stored in association only with users from an organizational boundary 126 and/or specifically selected productivity platforms 130.

As described in more detail below, in some implementations, aspects of the query results 108 may be exposed to the administrator device 120 via the query management portal 104. For example, the query results 108 may be transmitted to a device 120 and displayed to the administrator 122. Then, the administrator 122 can take various actions with respect to the query results 108 as appropriate.

Additionally, or alternatively, one or more predefined retention actions may be performed with respect to the query results 108. As a specific but non-limiting example, individual data files that are included within the query results 108 may be tagged with a data retention tag to prescribe a minimum retention age for the data files. In this way, these data files that were tagged as a result of being within the query results 108 will be preserved for at least a minimum prescribed retention age (e.g., seven years or any other predefined time).

The query scoping service 102 may further include one or more application programming interfaces (API) 110 that expose an interface through which the query scoping service 102 can send data to and/or receive data from the productivity platforms 130 and/or the user device 120. Through the use of this data interface and other interfaces, the devices and services described herein can communicate and process data in such a manner as to enable the functionality and/or operations disclosed herein.

Figure 2:
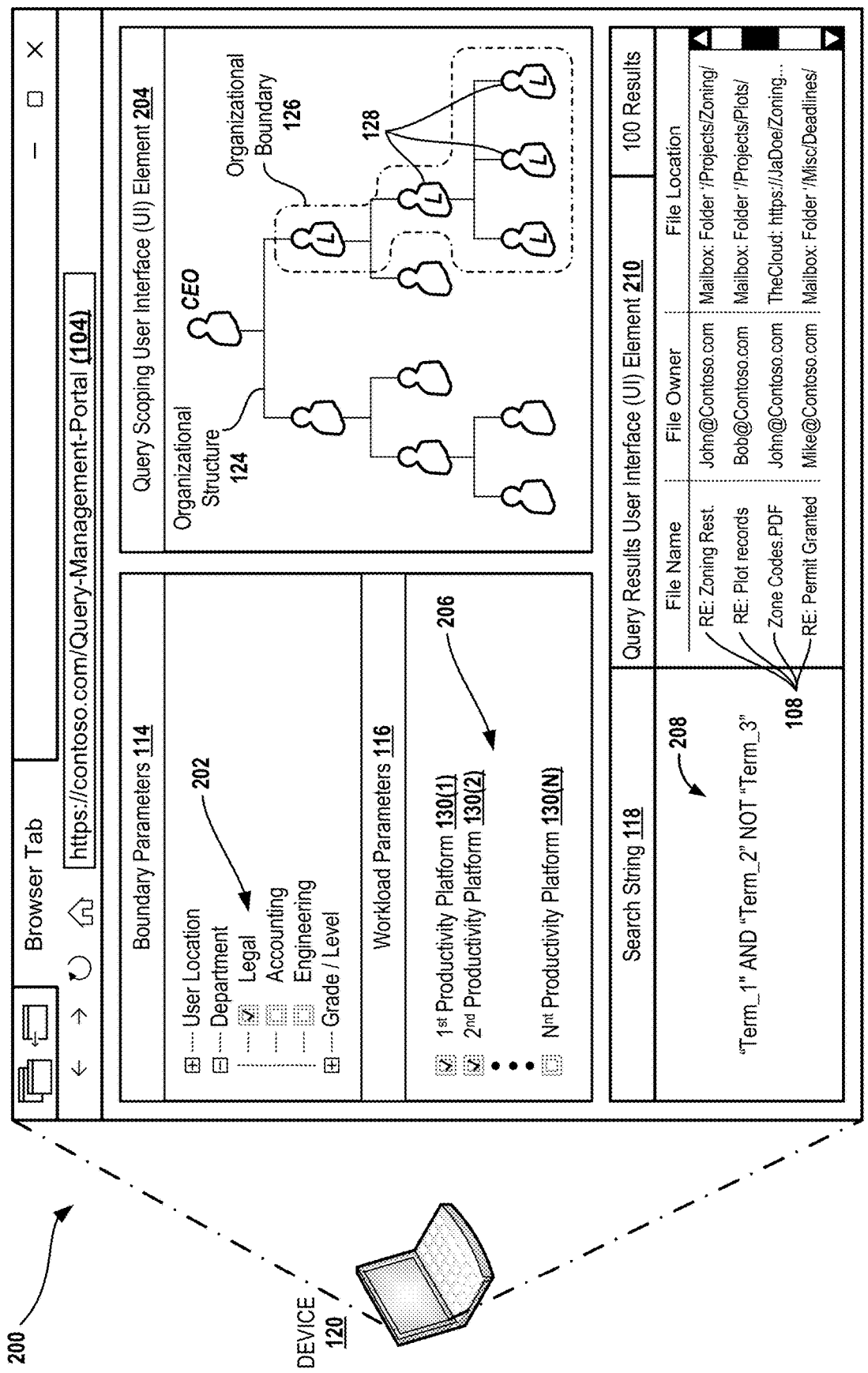
FIG. 2 illustrates aspects of an exemplary graphical user interface (GUI) corresponding to a query management portal (QMP) that enables an administrator to generate directory attribute bound queries.

Turning now to FIG. 2, illustrated are aspects of an exemplary graphical user interface (GUI) 200 that corresponds to the query management portal (QMP) 104 and that can be displayed on the administrator device 120 to enable the administrator 122 to generate directory attribute bound queries 112. In some embodiments, the GUI 200 may include one or more first user interface (UI) elements 202 that facilitate defining and/or editing the boundary parameters 114. In the specific but nonlimiting example illustrated in FIG. 2, the first UI elements 202 are in the form of various buttons that enable the administrator 122 to view the user attributes that are defined within the directory data 106. As illustrated, the administrator 122 has expanded a "Department" user attribute to make visible a plurality of possible values for this attribute field. Moreover, the administrator 122 has selected a button next to a value of "Legal." The result of this selection is that the boundary parameters 114 prescribe a value of "Legal" for the "Department" user attribute—the result being that an organizational boundary 126 is determined to exclusively encompass member of the Legal Department.

The GUI 200 of the query management portal 104 may also include a query scoping UI element 204 that graphically represents the organizational boundary 126 with respect to the organizational structure 124. In some implementations, at least a part of the organizational structure 124 may be graphically represented in a hierarchical format to visually communicate reporting structures and/or subsets of users that belong to particular departments. As illustrated, the graphical representation of the organizational structure 124 visually communicates the reporting structure of the various members of the Legal Department with respect to the CEO of the organization. Due to the administrator 122 having entered user input via the first UI elements 202 to define the boundary parameters 114 as being inclusive of the Legal Department, the query scoping UI element 204 is caused to graphically display the organizational boundary 126 as a dashed outline that encompasses all members of the Legal Department—but not other users within the organizational structure 124.

In some embodiments, the GUI 200 of the query management portal 104 may also include one or more workload UI elements 206 that enable the administrator 122 to select which productivity platforms 130 (also referred to herein as "workloads") the directory attribute bound query 112 is applicable to. As illustrated, for example, the administrator 122 has selected the first productivity platform 130(1) and a second productivity platform 130(2)—but not the $N^{th}$ productivity platform 130(N). Thus, data files that are included within the first data set 132(2) and the second data set 132(2) may be returned in the query results 108 but other data files that are included within the $N^{th}$ data set 132(N) will not be.

In some embodiments, the GUI 200 of the query management portal 104 may also include a query results UI element 210 that displays aspects of the query results 108. As illustrated, for example, the query results UI element 210 is displaying a file name, a file owner, and a file location. As further illustrated, the query results UI element 210 is showing aspects of four out of one-hundred query results 108.

Figure 3A:
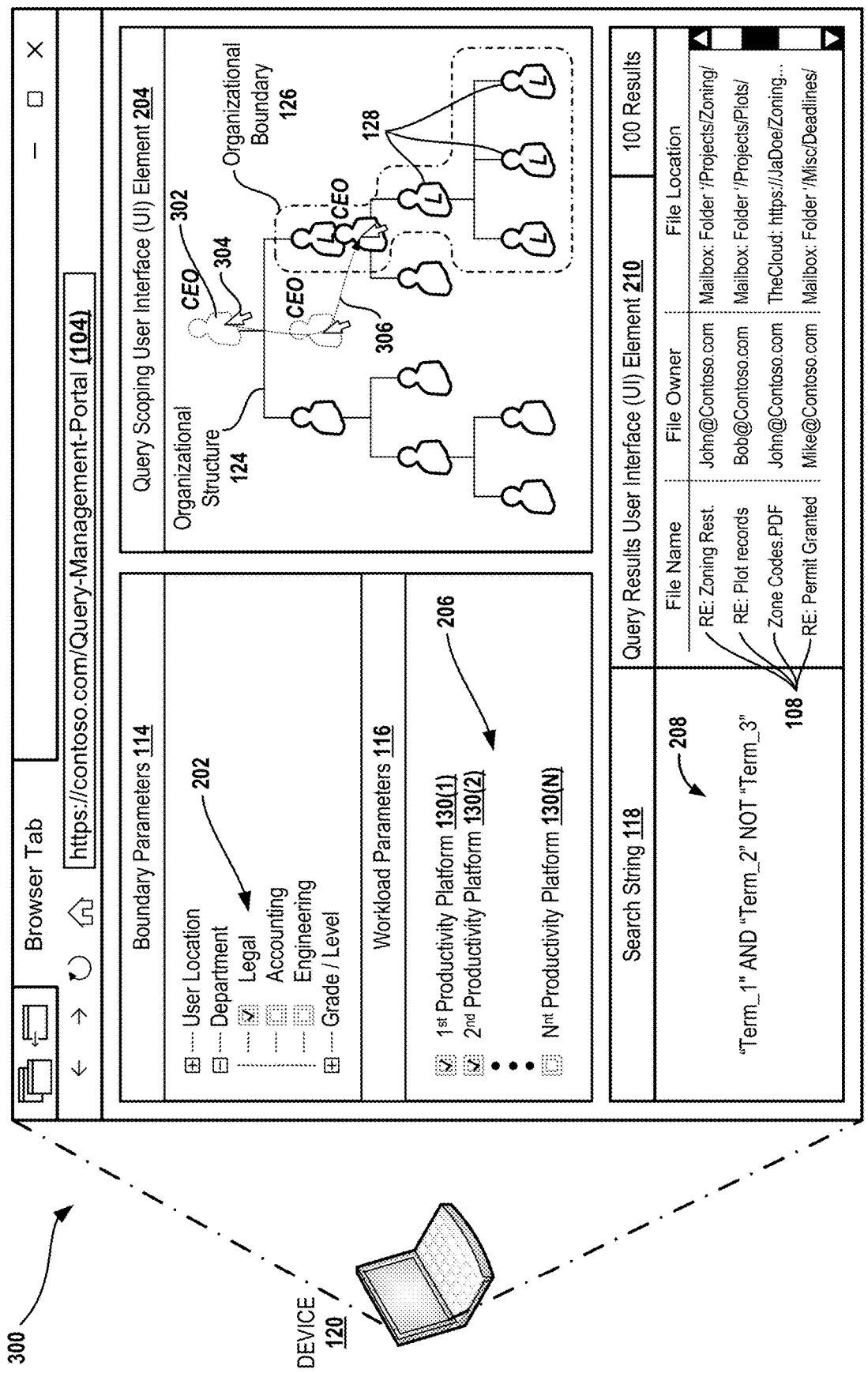
FIG. 3A illustrates aspects of an exemplary GUI that facilitates a drag-and-drop functionality that enables the administrator to graphically rearrange various user interface (UI) elements to update boundary parameters for a directory attribute bound query.
Figure 3B:
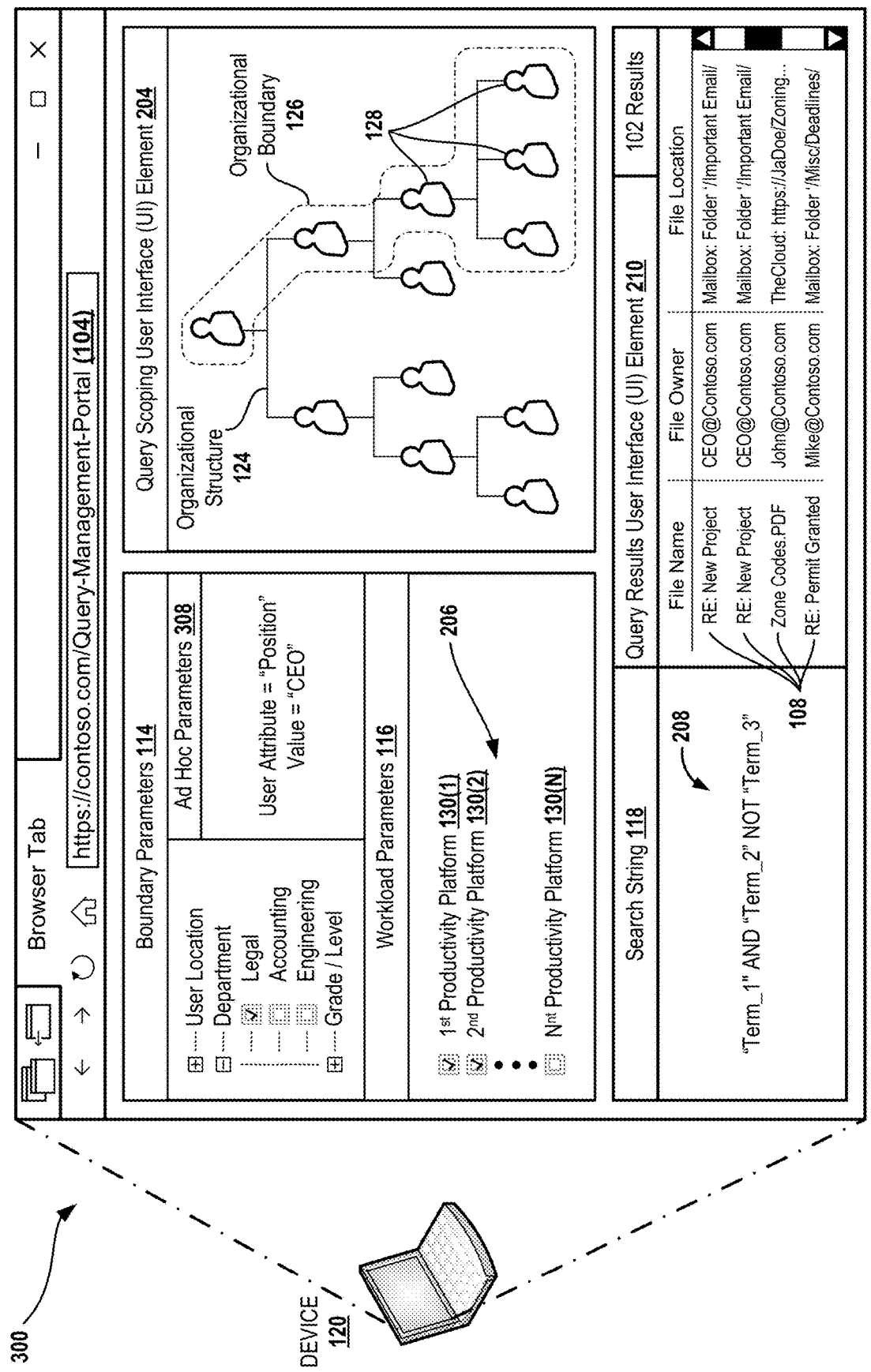
FIG. 3B illustrates aspects of an exemplary GUI showing that user input to graphically rearrange a user representation with respect to a boundary representation of an organizational boundary may cause the query scoping service to update the boundary parameters.

FIGS. 3A-3B illustrate aspects of a GUI 300 that corresponds to the query management portal 104 and that can be displayed to enable the administrator 122 to update the boundary parameters 114 by graphically manipulating various UI elements. In the specific but nonlimiting illustrated example, the administrator 122 manipulates a position of a graphical representation of the organizational boundary 128 with respect to aspects of the organizational structure 124. It will be appreciated that FIGS. 3A-3B may correspond to a logical flow of a sequence of GUIs that enable the administrator 122 to define aspects of the directory attribute bound query 112 such as, for example, the boundary parameters 114. It can be appreciated that the sequence of GUIs is included for explanatory purposes only and is not to be construed as a limitation.

Turning now to FIG. 3A, aspects of the GUI 300 are illustrated to convey a drag-and-drop functionality that enables the administrator 122 to graphically rearrange one or more UI elements to update the boundary parameters 114. As illustrated, the query scoping UI element 204 displays the organizational structure 124 and also a boundary representation. As used herein, the term "boundary representation" is used to refer to a graphical representation of the organizational boundary 126. Here, the boundary representation is shown as a dashed outline surrounding the Legal Department portion of the organizational structure 124.

In the illustrated example, the administrator 122 selects a user representation 302 (e.g., an "avatar") that graphically represents the CEO of the organization within the organizational structure 124. As illustrated, the administrator 122 may use a curser 304 to select the user representation 302 (e.g., by moving the curser over the user representation 302 and then depressing a button on a computer mouse). Then, the administrator 122 may drag the user representation 302 along a path 306 into the boundary representation of the organizational boundary 126. In this way, the administrator 122 is enabled to intuitively drag the CEO into the organizational boundary 128 for a particular directory attribute bound query 112 even without manually editing the boundary parameters 114.

Turning now to FIG. 3B, aspects of the GUI 300 are illustrated to demonstrate that the user input that graphically rearranged the user representation 302 of the CEO with respect to the boundary representation of the organizational boundary 126 results in the query scoping service 102 updating the boundary parameters 114. For example, as illustrated in FIG. 3B, the query scoping service 102 has updated the boundary parameters 114 to include ad hoc parameters 308. In this specific example, the ad hoc parameters 308 explicitly add the CEO to the organizational boundary 126.

In some implementations, the graphical representation of the organizational boundary 126 is updated within the query scoping UI element 204. For example, as illustrated in FIG. 3B, the user input described in association with FIG. 3A has caused the query scoping service 102 to update the boundary parameters 114 to include the ad hoc parameters 308. Responsive to the query scoping service 102 updating the boundary parameters 114, the query scoping UI element 204 has dynamically updated the graphical representation of the organizational boundary 126. In this way, the administrator 122 is enabled to quickly manipulate graphics within the query scoping UI element 204 and visually see the resulting impact on the boundary parameters 114 in substantially real time as the query scoping UI element 204 continuously updates the graphical representation of the organizational boundary 126.

In some implementations, the query results UI element 210 is automatically updated with "updated" query results based on the "updated" boundary parameters 114. For example, as illustrated, the number of individual data files that are included within the query results 108 has increased by two ("2") based on CEO being added to the organizational boundary 126. In particular, in FIG. 3A the number of data files in the query results is one-hundred ("100") whereas in FIG. 3B the number of data files within the query results is one-hundred and two ("102").

Figure 4A:
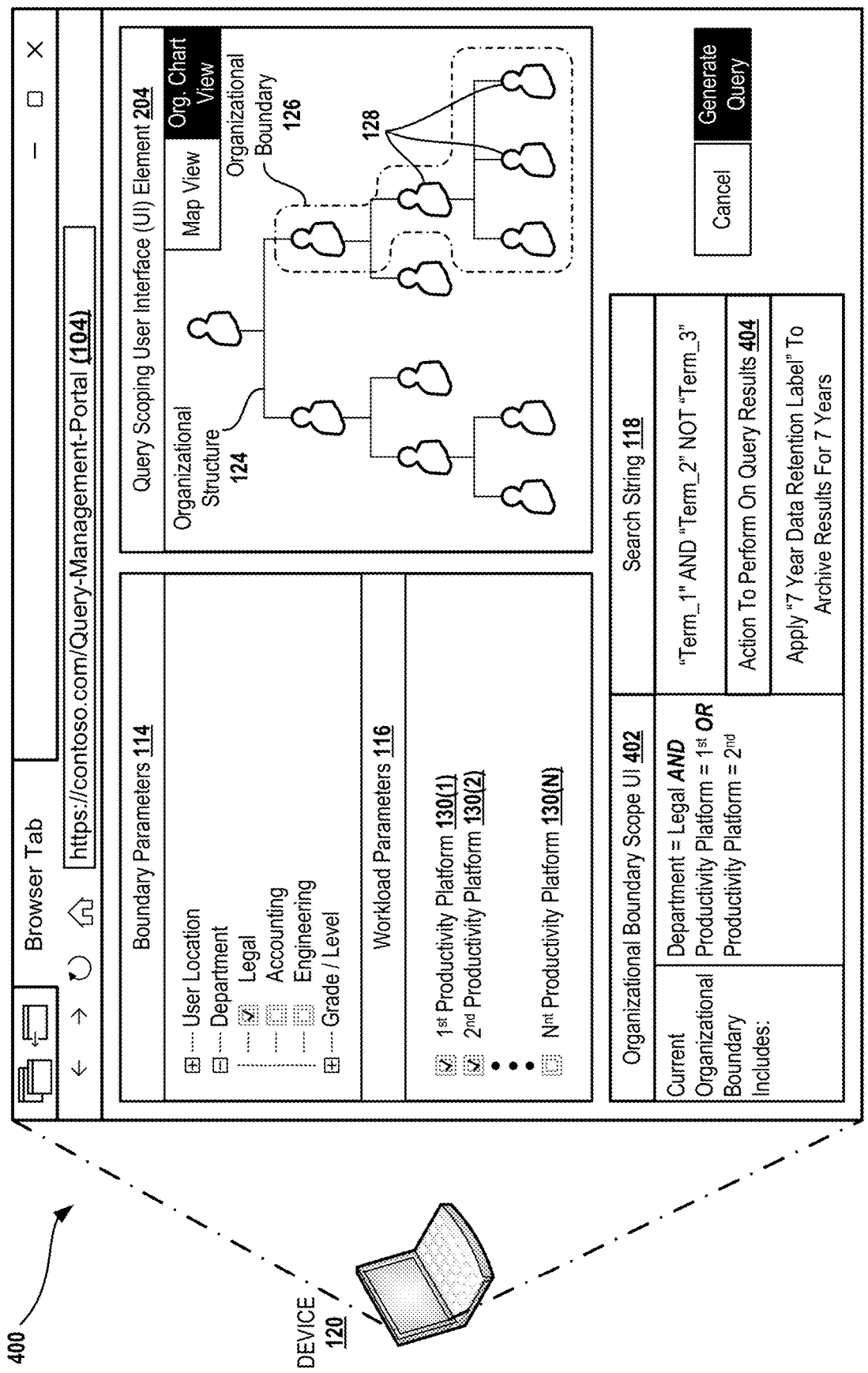
FIG. 4A illustrates aspects of an exemplary GUI that enables the administrator to toggle a query scoping UI element between multiple different types of views that correspond to various user attributes.

Turning now to FIG. 4A, aspects are illustrated of an exemplary GUI 400 that enables the administrator 122 to toggle the query scoping UI element 204 between multiple different types of view. In the illustrated example, the GUI 400 enables the administrator 122 to toggle between a "Map View" and an "Organizational Chart View." In FIG. 4A the "Organizational Chart View" is selected. It can be appreciated that the "Organizational Chart View" corresponds to the views shown in FIG. 2 and FIGS. 3A and 3B; accordingly, the "Organizational Chart View" is not discussed in detail with respect to FIG. 4A.

In some implementations, the GUI 400 includes an organizational boundary scope UI 402 that communicates to the administrator 122 the current scope of the organizational boundary 126 as defined by the currently selected combination of boundary parameters 114 and workload parameters 116. As illustrated, for example, the currently selected fields within the boundary parameters 114 correspond to a value of "Legal" for the "Department" user attribute. Also, the currently selected fields within the workload parameters 116 correspond to the first productivity platform 130(1) and the second productivity platform 130(2). Based on these current selections for the boundary parameters 114 and the workload parameters 116, the organizational boundary scope UI 402 communicates to the administrator 122 that the "Current Organizational Boundary Includes:" data files that are stored in association with members of the Legal Department and are further stored in association with at least one of the first productivity platform 130(1) or the second productivity platform 130(2).

Figure 4B:
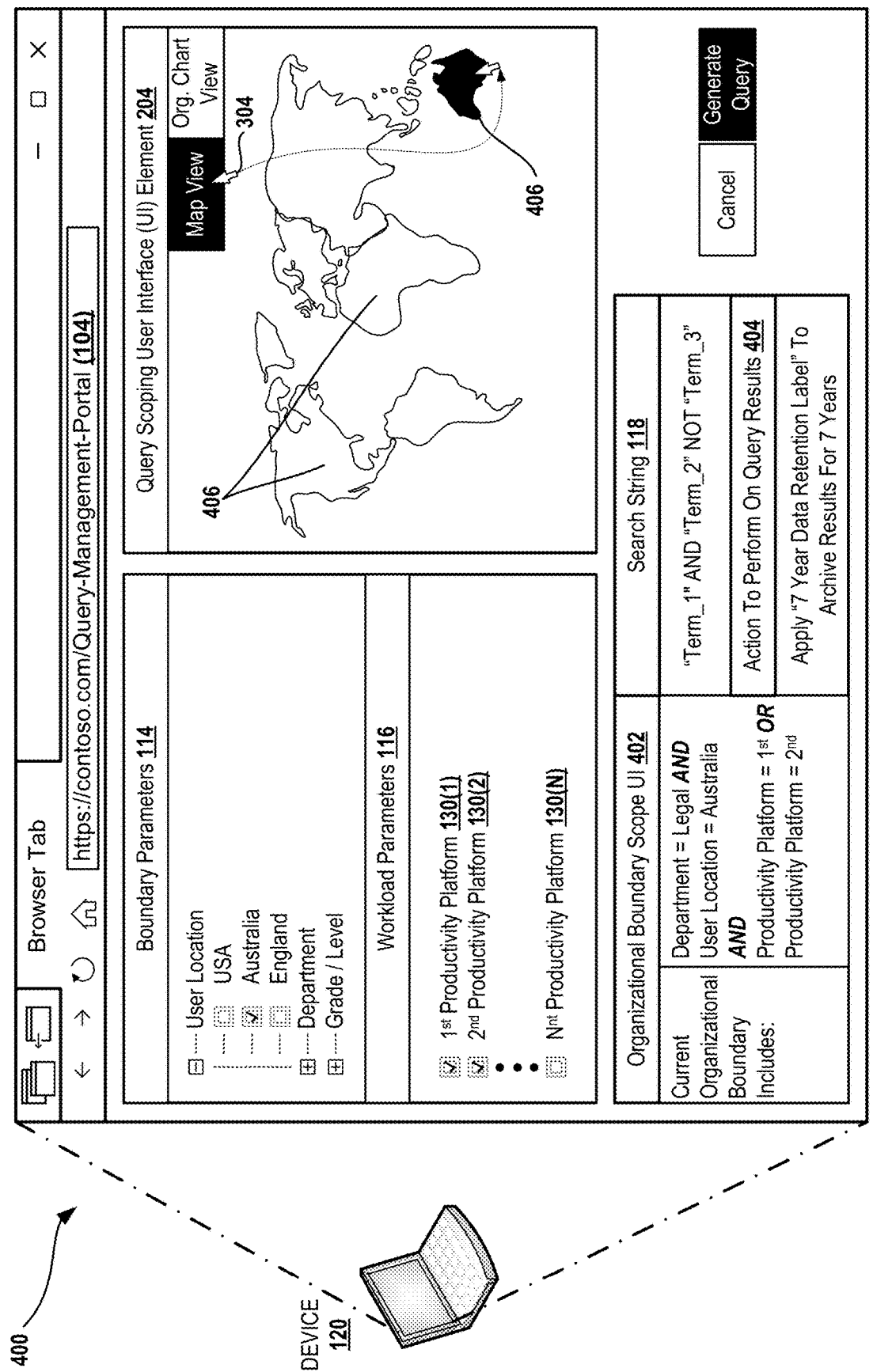
FIG. 4B illustrates aspects of the GUI with an alternative view being selected as compared to FIG. 4A.

Turning now to FIG. 4B, aspects are illustrated of the GUI 400 with the "Map View" selected. As illustrated, the administrator 122 has selected the "Map View" to cause the query scoping UI element 204 to display one or more geographical map UI elements 406. The administrator 122 then uses a curser 304 to select a particular one of the geographical map UI elements 406 to cause the query scoping service 102 to update the boundary parameters 114. In the specific but non-limiting example, the particular geographical map UI element 406 that the administrator 122 has selected corresponds to the country of Australia. As a result, the query scoping service 102 has updated the boundary parameters 114 to further prescribe a value of "Australia" for a "User Location" directory attribute to dynamically limit the query scope to include only users that are indicated within the directory data as being located in an Australia region. Responsive to this additional boundary parameter, the organizational boundary scope UI 402 is updated to communicate to the administrator 122 that the "Current Organizational Boundary Includes:" data files that are stored in association with members of the Legal Department that are located in Australia, and are further stored in association with at least one of the first productivity platform 130(1) or the second productivity platform 130(2).

In some implementations, the GUI 400 enables the administrator 122 to define various actions to perform against the query results 108 for a directory attribute bound query 112. As illustrated, for example, the administrator 122 has defined an action to perform against the query results 108 as applying a "7 Year Data Retention Label" to each of the individual files that show up in the query results 108.

It can be appreciated that data retention labels (a.k.a. "tags") may be applied to individual data files to prescribe predetermined actions that are to be performed against the individual data files based on predetermined conditions being met with respect to these individual data files. Exemplary conditions include, but are not limited to: reaching and/or exceeding a file purge age as measured from a date of creation of a particular file; reaching and/or exceeding a file purge age as measured from a date that a particular file was last modified; reaching and/or exceeding a retention age threshold as measured from a date of creation or a date a file was last modified; an age of the file being within a file retention period; being manually tagged by a user with a label (e.g. a "Tax Record" label indicating that a particular file is tax related); and/or being automatically tagged by the system with a label. Exemplary actions to be performed with respect to files that satisfy one or more conditions include, but are not limited to, forcibly retaining a particular file within system storage (e.g. preventing a user from deleting the file), moving a particular file to an archive, purging a particular file from system storage, preventing a particular file from being displayed to the information worker 152 via one or more of the productivity platforms, preventing a particular file from being modified by the information worker, and/or prompting a user (e.g. the administrator and/or the information worker) to indicate whether to retain and/or purge a particular file.

Accordingly, in addition to being usable to perform quick and intuitive searches for data files, the presently disclosed techniques further enable administrators to tie one or both of boundary parameters 114 and workload parameters 116 to individual data retention labels. In this way, the application of these data retention labels can be linked to an organizational boundary 128 that is dynamic in nature and automatically adapts to changes within the organizational structure 124. For example, if a particular data retention label is applicable exclusively to members of the Legal Department within an organization, this particular data retention label may be associated with boundary parameters 114 so that the subset(s) of data files that are analyzed with respect to the particular data retention label is continually updated to appropriately match the current members of the Legal Department.

Figure 5:
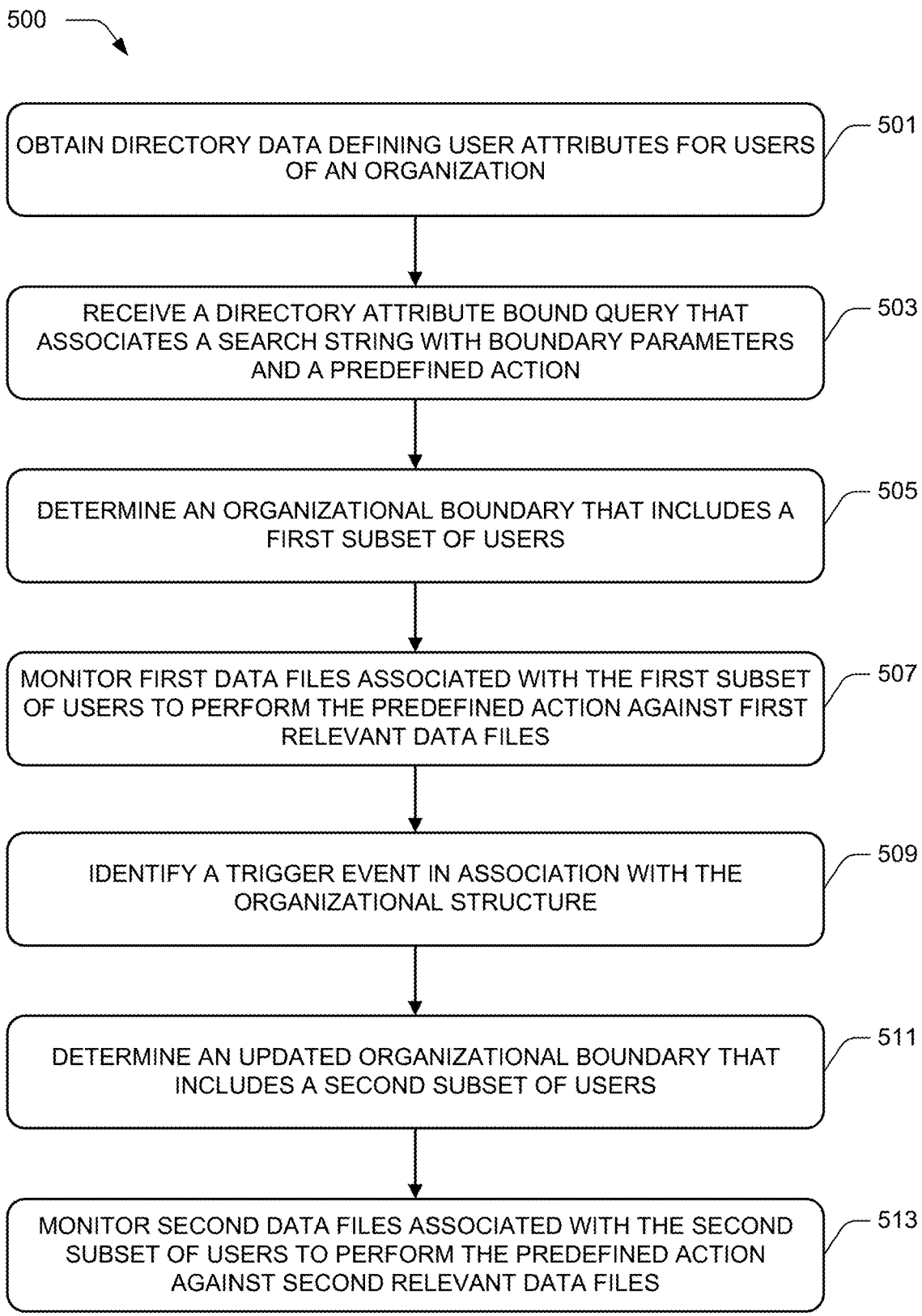
FIG. 5 is a flow diagram of an illustrative process to cause a query scoping service to dynamically update an organizational boundary for a directory attribute bound query in response to a trigger event occurring in association with an organizational structure.

FIG. 5 is a flow diagram of an illustrative process 500 to cause a query scoping service 102 to dynamically update an organizational boundary for a directory attribute bound query in response to a trigger event occurring in association with an organizational structure. The process 500 is described with reference to FIGS. 1-4B. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 501, a system may obtain directory data that defines user attributes for multiple users associated with an organizational structure. In various implementations, the directory data defines specific values for the user attributes. For example, on a per-user-basis, the directory data may define values for one or more of a "Department" user attribute, a "Location" user attribute, and so on.

At block 503, the system may receive a directory attribute bound query that associates a search string with at least boundary parameters and a predefined action. The boundary parameters may prescribe one or more values for the user attributes that are associated with the directory data. The predefined action may include one or more predefined retention actions that are to be performed with respect to query results. For example, individual data files that are included within the query results may be tagged with a data retention tag to prescribe a minimum retention age for the data files.

At block 505, the system may analyze the directory data with respect to the boundary parameters to determine an organizational boundary that includes a first subset of users. For example, the system may identify which users that are represented in the directory data have values certain user attributes that match those values prescribed by the boundary parameters. As a specific but nonlimiting example, the system may identify the first subset as all users within the organization that have a value of "Legal" set for a "Department" user attribute.

At block 507, the system may monitor first data files that are associated with the first subset of user to identify relevant data files that satisfy the search string. For example, the system may identify user accounts that individual users within the first subset of users have been assigned on one or more productivity platforms. Then, the system may monitor data files that are generated on, uploaded to, modified on, or otherwise stored in association with these identified user accounts. Then, as relevant data files are identified that satisfy the search string, the system may perform the predetermined action with respect to these relevant data files.

At block 509, the system may identify that a trigger event has occurred in association with the organizational structure. For example, system may identify that a user has been added to and/or removed from the first subset of users. As another example, the system may determine that a new version of the organizational structure has been internally released within the organization.

At block 511, subsequent to the trigger event occurring with respect to the organizational structure, the system may determine an updated organizational boundary that includes a second subset of users (e.g., an updated subset of users). For example, the system may identify which users in the directory data that represents the updated organizational structure now have values the certain user attributes that match those values prescribed by the boundary parameters. As a specific but nonlimiting example, if a particular user has been added to the Legal Department, the system may identify that this particular user is to be added to the subset of users.

At block 513, the system may monitor second data files that are associated with the second subset of user to identify additional relevant data files that satisfy the search string. Then, as relevant data files are identified that satisfy the search string, the system may perform the predetermined action with respect to these relevant data files. It can be appreciated that in the context of the directory attribute bound query being implemented to enforce a particular file retention rule, the process 500 may be continually performed as changes occur to the organizational structure (and therefore to the directory data) so that the particular file retention rule is always applied to the intended subset of users irrespective of the dynamic nature of the typical organizational structure.

Figure 6:
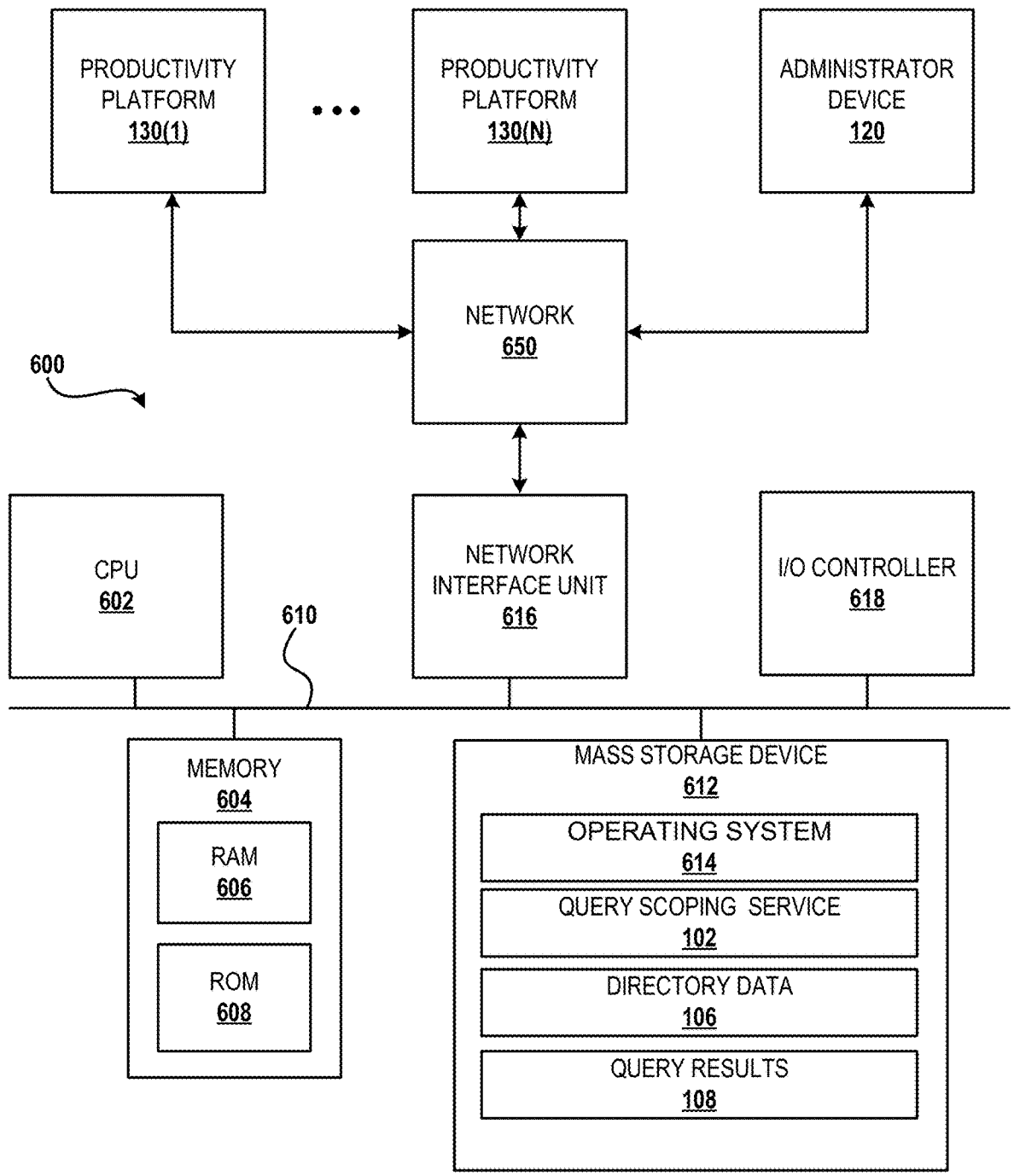
FIG. 6 shows additional details of an example computer architecture for a computer capable of executing the query scoping service and/or any program components thereof as described herein.

FIG. 6 shows additional details of an example computer architecture 600 for a computer capable of executing the query scoping service 102 and/or any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the query scoping service 102, the directory data 106, and/or the query results 108.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable the query scoping service 102 to communicate with one or more of the productivity platforms 130 and/or the user device 120.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

The disclosure presented herein may be considered in view of the following clauses.

EXAMPLE CLAUSES

The disclosure presented herein may be considered in view of the following clauses.

Example Clause A, a system for performing directory attribute bound queries, the system comprising: at least one processor; and at least one memory in communication with the at least one processor, the at least one memory having computer-readable instructions stored thereupon that, when executed by the at least one processor, cause the at least one processor to: obtain directory data defining user attributes for a plurality of users associated with an organizational structure; receive, from a computing device, a directory attribute bound query that defines at least a search string and boundary parameters that prescribe one or more values for the user attributes; determine, based on the directory data, an organizational boundary that includes a subset of users, of the plurality of users, for which the user attributes correspond to the one or more values; parse one or more data sets that correspond to one or more productivity platforms to identify a subset of data files that are stored in association with the subset of users that are included within the organizational boundary; analyze the subset of data files with respect to the search string to identify query results that include relevant data files that satisfy the search string; and communicate the query results to the computing device to cause display of aspects of the relevant data files.

Example Clause B, the system of Example Clause A, wherein the computer-readable instructions further cause the at least one processor to expose a query management portal that includes one or more user interface (UI) elements that enable an administrator to define the one or more values for the user attributes.

Example Clause C, the system of Example Clause B, wherein the query management portal further includes at least one UI element that enables the administrator to define workload parameters that indicate individual platform selections to limit the subset of data files, from which the query results are identified, to the one or more productivity platforms.

Example Clause D, the system of Example Clause B, wherein the one or more UI elements include user representations corresponding to at least some of the plurality of users and a boundary representation corresponding to the organizational boundary.

Example Clause E, the system of Example Clause D, wherein the one or more UI elements enable the administrator to update the organizational boundary by modifying a graphical position of the boundary representation with respect to at least one of the user representations.

Example Clause F, the system of Example Clause B, wherein the one or more UI elements include a geographical map UI element corresponding to at least one geographic territory, and wherein a selection of the geographical map UI element causes an update of the organizational boundary based on the at least one geographic territory.

Example Clause G, the system of Example Clause A, wherein the boundary parameters prescribe the one or more values for at least one of: a user location attribute to set the organizational boundary to a predetermined geographic area, or a department attribute to set the organizational boundary to a predetermined department.

Example Clause H, the system of Example Clause A, wherein the directory attribute bound query is associated with at least one predefined action that is prescribed to be performed with respect to the relevant data files that satisfy the search string.

Example Clause I, the system of Example Clause H, wherein the at least one predefined action includes deleting the relevant data files from at least one storage device associated with the one or more productivity platforms.

Example Clause J, a computer-implemented method, comprising: obtaining directory data that defines user attributes for multiple users of an organizational structure; receiving a directory attribute bound query that defines at least a search string and boundary parameters, wherein the boundary parameters prescribe one or more values for the user attributes; analyzing the directory data with respect to the boundary parameters to determine an organizational boundary that defines a user subset, of the multiple users, for which the user attributes correspond to the one or more values; parsing at least one data set that defines multiple data files that are stored in association with at least one productivity platform to identify a file subset that corresponds to the organizational boundary; analyzing the file subset with respect to the search string to identify relevant data files that satisfy the search string; and executing at least one predefined action with respect to the relevant data files.

Example Clause K, the computer-implemented method of Example Clause J, further comprising: determining an occurrence of a trigger event in association with the organizational structure; and responsive to the trigger event, re-analyzing the directory data with respect to the boundary parameters to determine an updated organizational boundary that defines an updated user subset of the multiple users.

Example Clause L, the computer-implemented method of Example Clause J, wherein the boundary parameters are generated based on a user input to manipulate a graphical position of a user representation of at least one of user, of the user subset, with respect to a graphical representation of the organizational boundary.

Example Clause M, the computer-implemented method of Example Clause J, wherein the directory attribute bound query further defines workload parameters that indicate at least one individual selection of the at least one productivity platform to exclude, from the file subset, other data files that are stored in association with other productivity platforms that are different than the at least one productivity platform.

Example Clause N, the computer-implemented method of Example Clause M, further comprising exposing a query management portal that includes user interface (UI) elements that enables an administrator to dynamically update the one or more values for the user attributes by modifying a graphical position of a boundary representation, that corresponds to the organizational boundary, with respect to a user representation, that corresponds to one or more of the multiple users.

Example Clause O, the computer-implemented method of Example Clause N, wherein the executing the at least one predefined action includes: generating query results by compiling aspects of the relevant data files, communicating the query results to a computing device for display via the query management portal; and responsive to the graphical position of the boundary representation being modified with respect to the user representation, communicating updated query results to the computing device for display via the query management portal.

Example Clause P, the computer-implemented method of Example Clause J, wherein the executing the at least one predefined action includes associating a retention label with the relevant data files.

Example Clause Q, a system for selectively updating user applications, the system comprising: at least one processor; and at least one memory in communication with the at least one processor, the at least one memory having computer-readable instructions stored thereupon that, when executed by the at least one processor, cause the at least one processor to: obtain directory data that defines user attributes for multiple users associated with an organizational structure; receive a directory attribute bound query that associates a search string with at least a predefined action and boundary parameters, wherein the boundary parameters prescribe one or more values for the user attributes; determine, based on the directory data, an organizational boundary that includes a subset of the multiple users for which the user attributes correspond to the one or more values; monitor first data files that are associated with the subset to perform the predefined action with respect to first relevant data files that satisfy the search string; responsive to a trigger event occurring in association with the organizational structure: update the organizational boundary to include an updated subset of the multiple users for which the user attributes correspond to the one or more values; and monitor second data files that are associated with the updated subset to perform the predefined action with respect to second relevant data files that satisfy the search string.

Example Clause R, the system of Example Clause Q, wherein the computer-readable instructions further cause the at least one processor to expose a query management portal that enables the one or more values for the user attributes to be defined by modifying a graphical position of a first graphical representation, that represents the organizational boundary, with respect to a second graphical representation that represents the organizational structure.

Example Clause S, the system of Example Clause Q, wherein the boundary parameters prescribe the one or more values for a department attribute to set the organizational boundary to a predetermined department.

Example Clause T, the system of Example Clause Q, wherein performing the predefined action includes at least a retention label with the first relevant data files and the second relevant data files.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, as used in the claims, the term "at least one computing device" and the term "one or more computing devices" being used within a single claim is not to be construed as a single element. For example, a system may cause "at least one computing device" to perform some actions and "one or more computing devices" to perform other actions. In some implementations, the "at least one computing device" may share some of all of the individual devices with the "one or more computing devices." For example, the "at least one computing device" wholly or partially overlap with the "one or more computing devices." In some embodiments, no single computing device of the "at least one computing device" is shared with or otherwise common to the "one or more computing devices."

What is claimed is:

1. A system for performing directory attribute bound queries, the system comprising:
   at least one processor; and
   at least one memory in communication with the at least one processor, the at least one memory having computer-readable instructions stored thereupon that, when executed by the at least one processor, cause the at least one processor to:
      obtain directory data defining:
         a first value, for a user attribute, in association with a first user identifier within an organizational structure, and
         a second value, for the user attribute, in association with a second user identifier within the organizational structure;
      receive, from a computing device, a directory attribute bound query that defines both of:
         a search string that specifies keywords or file properties, and
         a boundary parameter that specifies the first value for the user attribute and that does not specify the second value for the user attribute;
      determine, based on the directory data, an organizational boundary that includes a first plurality of users associated with the first user identifier based on the boundary parameter specifying the first value for the user attribute, wherein the organizational boundary does not include a second plurality of users associated with the second user identifier based on the boundary parameter not specifying the second value for the user attribute;
      access a plurality of data files stored for an organization;
      identify, from the plurality of data files and prior to implementing a data file search using the search string, first data files that are stored in association with the first plurality of users and that are not stored in association with the second plurality of users, wherein identifying the first data files omits second data files that are stored in association with the second plurality of users and that are not stored in association with the first plurality of users;
      implement the data file search using the search string on the first data files based on the boundary parameter specifying the first value for the user attribute, wherein the second data files are not searched based on the boundary parameter not specifying the second value for the user attribute;
      identify, based on the data file search implemented on the first data files based on the boundary parameter specifying the first value for the user attribute, at least one third data file that satisfies the search string; and
      communicate the at least one third data file as query results to the computing device.

2. The system of claim 1, wherein the computer-readable instructions further cause the at least one processor to expose a query management portal that includes at least one user interface (UI) element that enables an administrator to define the boundary parameter defined by the directory attribute bound query.

3. The system of claim 2, wherein the at least one UI element further enables the administrator to define workload parameters that indicate a selection that limits the plurality of data files, from which the first data files are identified, to a productivity platform of a plurality of productivity platforms for the organization.

4. The system of claim 2, wherein the at least one UI element includes a first user representation corresponding to the first user identifier and a second user representation corresponding to the second user identifier and a boundary representation corresponding to the organizational boundary.

5. The system of claim 4, wherein the at least one UI element enables the administrator to update the organizational boundary by modifying a graphical position of the boundary representation with respect to at least one of the first user representation or the second user representation.

6. The system of claim 2, wherein the at least one UI element includes a geographical map UI element corresponding to at least one geographic territory, and wherein a selection of the geographical map UI element causes an update of the organizational boundary based on the at least one geographic territory.

7. The system of claim 1, wherein the user attribute for which the first value is specified by the boundary parameter is a department attribute that limits the organizational boundary to a predetermined department, the predetermined department comprising a plurality of different roles.

8. The system of claim 1, wherein the directory attribute bound query is associated with a predefined action that is prescribed to be performed with respect to the at least one third data file that satisfies the search string.

9. The system of claim 8, wherein the predefined action includes deleting the at least one third data file from at least one storage device.

10. A computer-implemented method, comprising:
    obtaining directory data that defines:
       a first value, for a user attribute, in association with a first plurality of users within an organizational structure; and
       a second value, for the user attribute, in association with a second plurality of users within the organizational structure;
    receiving a directory attribute bound query that defines:
       a search string that specifies keywords or file properties; and
       a boundary parameter that specifies the first value for the user attribute and that does not specify the second value for the user attribute;
    analyzing the directory data with respect to the boundary parameter to determine an organizational boundary that includes the first plurality of users and that omits the second plurality of users;
    identifying, from a plurality of data files and prior to implementing a data file search using the search string, first data files stored in association with the first plurality of users within the organizational structure, wherein identifying the first data files omits second data files stored in association with the second plurality of users within the organizational structure;
    implementing the data file search using the search string on the first data files based on the boundary parameter specifying the first value for the user attribute, wherein the second data files are not searched based on the boundary parameter not specifying the second value for the user attribute;

identifying, based on the data file search implemented on the first data files based on the boundary parameter specifying the first value for the user attribute, at least one third data file that satisfies the search string; and executing at least one predefined action with respect to the relevant at least one third data file.

11. The computer-implemented method of claim 10, further comprising:

determining an occurrence of a trigger event in association with the organizational structure; and responsive to the trigger event, re-analyzing the directory data with respect to the boundary parameter to determine an updated organizational boundary that defines an updated plurality of users within the organizational structure.

12. The computer-implemented method of claim 10, wherein the boundary parameter is generated based on a user input to manipulate a graphical position of a user representation with respect to a graphical representation of the organizational boundary.

13. The computer-implemented method of claim 10, wherein the directory attribute bound query further defines workload parameters that indicate at least one individual selection of at least one productivity platform to exclude, from the plurality of data files, other data files that are stored in association with other productivity platforms that are different than the at least one productivity platform.

14. The computer-implemented method of claim 13, further comprising exposing a query management portal that includes at least one user interface (UI) element that enables an administrator to dynamically update values for user attributes by modifying a graphical position of a boundary representation, that corresponds to the organizational boundary, with respect to a user representation, that corresponds to one or more users.

15. The computer-implemented method of claim 14, wherein the executing the at least one predefined action includes:

generating query results by compiling aspects of the at least one third data file, communicating the query results to a computing device for display via the query management portal; and responsive to the graphical position of the boundary representation being modified with respect to the user representation, communicating updated query results to the computing device for display via the query management portal.

16. The computer-implemented method of claim 10, wherein the executing the at least one predefined action includes associating a retention label with the at least one third data file.

17. A system comprising:

at least one processor; and at least one memory in communication with the at least one processor, the at least one memory having computer-readable instructions stored thereupon that, when executed by the at least one processor, cause the at least one processor to:

obtain directory data that defines a first value, for a user attribute, in association with a first user within an organizational structure, and a second value, for the user attribute, in association with a second user within the organizational structure;

receive a directory attribute bound query that:

associates a search string with at least a predefined action, and defines a boundary parameter that specifies the first value for the user attribute and that does not specify the second value for the user attribute;

determine, based on the directory data, an organizational boundary that includes the first user and that omits the second user;

identify, from a plurality of data files and prior to implementing a data file search using the search string, first data files stored in association with the first user, wherein identifying the first data files omits second data files stored in association with the second user;

implement the data file search using the search string on the first data files based on the boundary parameter specifying the first value for the user attribute, wherein the second data files are not searched based on the boundary parameter not specifying the second value for the user attribute;

identify, based on the search implemented on the first data files based on the boundary parameter specifying the first value for the user attribute, at least one third data file that satisfies the search string; and execute the predefined action with respect to the relevant at least one third data file.

18. The system of claim 17, wherein the computer-readable instructions further cause the at least one processor to expose a query management portal that enables at least one value for the user attribute to be defined by modifying a graphical position of a first graphical representation, that represents the organizational boundary, with respect to a second graphical representation that represents the organizational structure.

19. The system of claim 17, wherein the first value for the user attribute sets the organizational boundary to a predetermined department within an organization, the predetermined department comprising a plurality of different roles.

20. The system of claim 17, wherein performing the predefined action includes applying a retention label to the at least one third data file.

* * * * *